(12) United States Patent
Hemelsdael et al.

(10) Patent No.: US 11,906,541 B2
(45) Date of Patent: Feb. 20, 2024

(54) CHECKING AND ANGLE-OF-ATTACK SENSOR VANE ASSEMBLY

(71) Applicant: THALES, Courbevoie (FR)

(72) Inventors: Cécile Hemelsdael, Vendome (FR); Stéphane Damiens Tessier, Vendome (FR)

(73) Assignee: THALES, Meudon (FR)

( * ) Notice: Subject to any disclaimer, the term of this patent is extended or adjusted under 35 U.S.C. 154(b) by 261 days.

(21) Appl. No.: 16/894,714

(22) Filed: Jun. 5, 2020

(65) Prior Publication Data

US 2020/0386783 A1    Dec. 10, 2020

(30) Foreign Application Priority Data

Jun. 6, 2019    (FR) ...................................... 1906004

(51) Int. Cl.
*G01P 21/00*    (2006.01)
*G01B 3/38*    (2006.01)
*G01P 13/02*    (2006.01)

(52) U.S. Cl.
CPC ................ *G01P 21/00* (2013.01); *G01B 3/38* (2013.01); *G01P 13/025* (2013.01)

(58) Field of Classification Search
CPC ......... G01P 21/00; G01P 13/025; G01B 3/38; G01B 3/42; G01B 3/44

USPC ............... 73/1.29, 1.75, 1.78, 865.9; 33/501, 33/501.02, 501.03, 501.05, 534, 567; 244/181

See application file for complete search history.

(56) References Cited

U.S. PATENT DOCUMENTS 6,342,846 B1 *   1/2002   Argentieri ............. G01P 13/025
                                                                       340/967
2014/0116106 A1   5/2014   Pelletier et al.

FOREIGN PATENT DOCUMENTS

FR    2 531 595 A1    2/1984
FR    2803387    *   7/2001
FR    2 856 799 A1    12/2004

* cited by examiner

*Primary Examiner* — Robert R Raevis
(74) *Attorney, Agent, or Firm* — BakerHostetler

(57) ABSTRACT

Methods and devices for checking the geometry of an angle-of-attack sensor belonging to an aircraft are provided. The device includes one or more stages, a stage comprising a slot the geometric dimensions of which are specifically configured to accept a portion of the said angle-of-attack sensor. The device allows a visual inspection but can also be instrumented (photoelectric cell, laser, camera) in order to verify the geometry of the sensor in detail. Developments notably describe the use of signal indicators, motorized stages, one or more image sensors, specific materials, communications with computers, or placement by drone and/or robotic arm. Software aspects are described.

15 Claims, 5 Drawing Sheets

[Fig. 1]
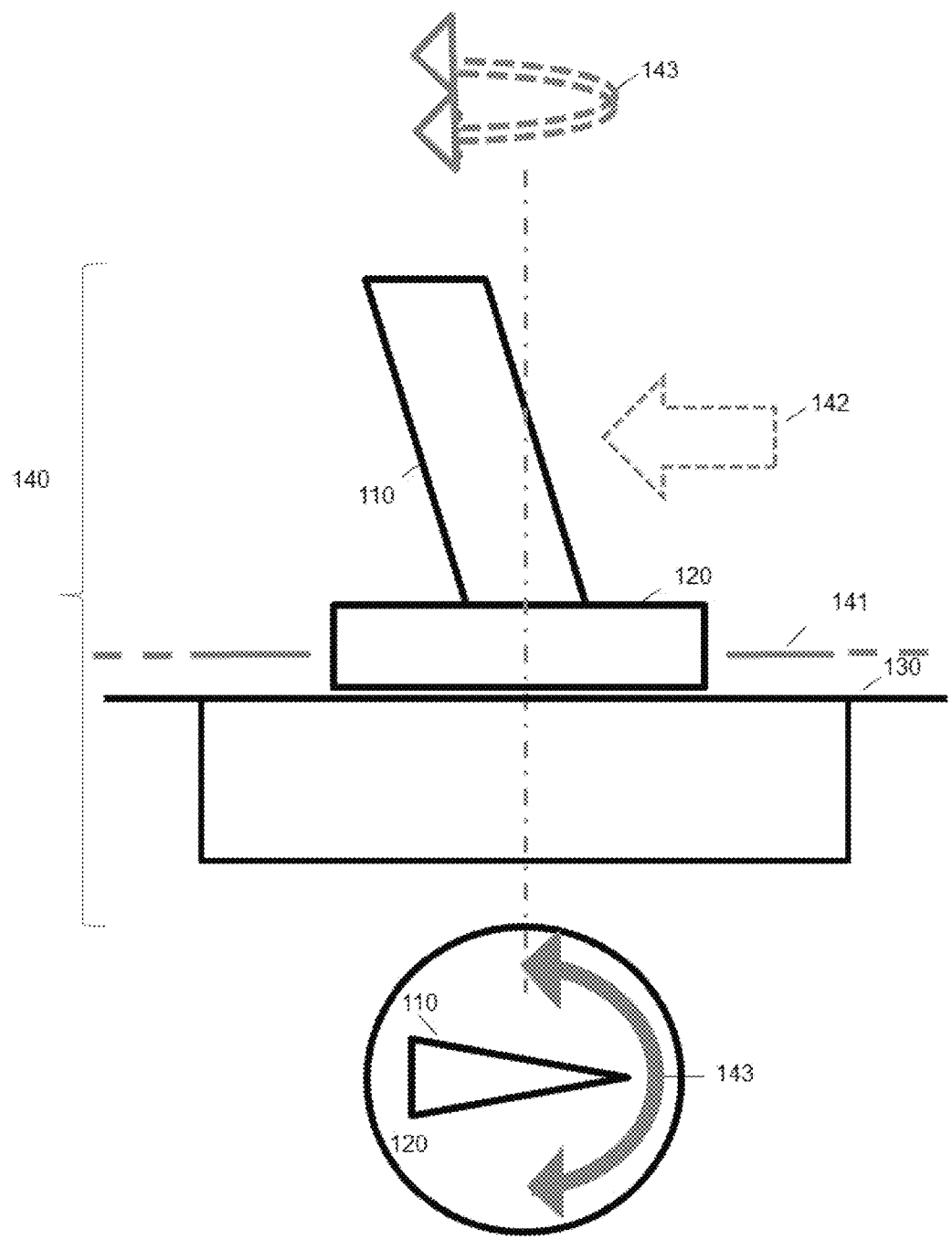

[Fig. 2]
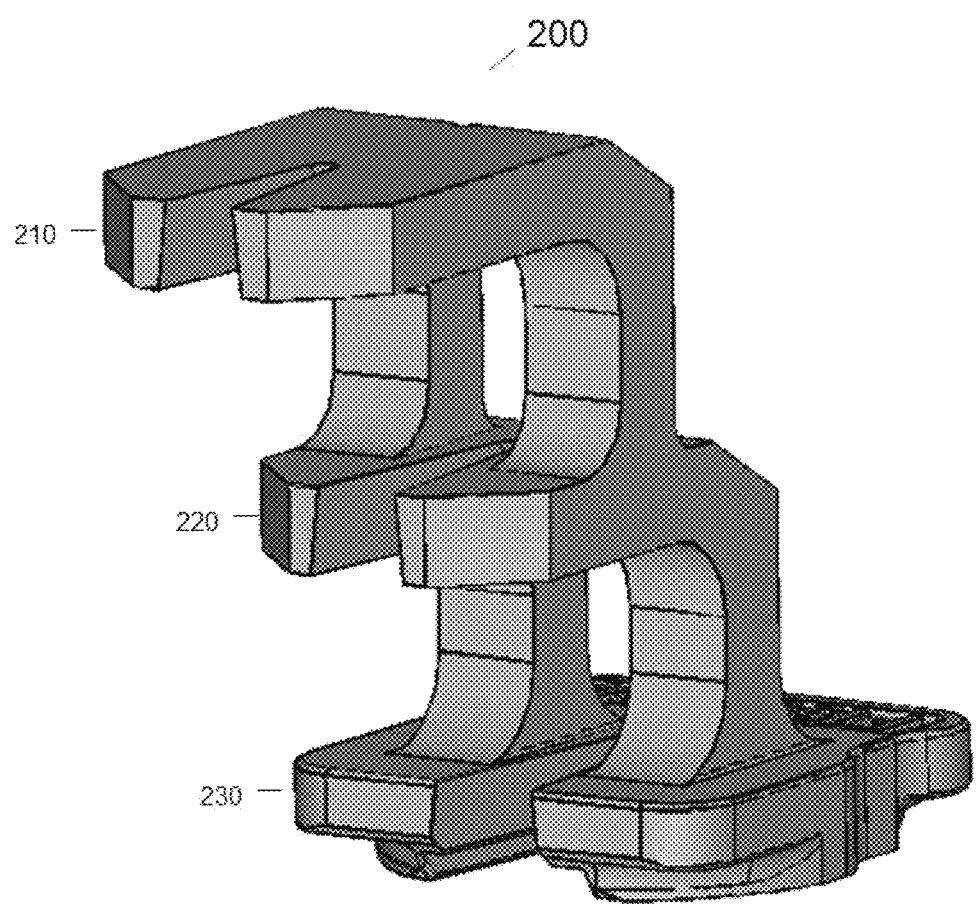

[Fig. 3]
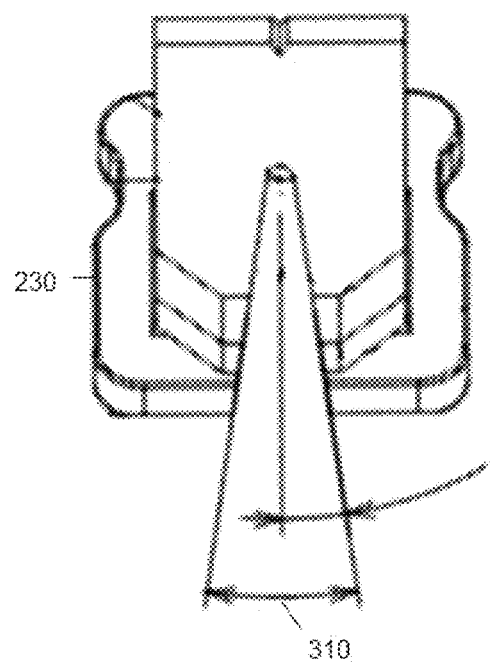

[Fig. 4]
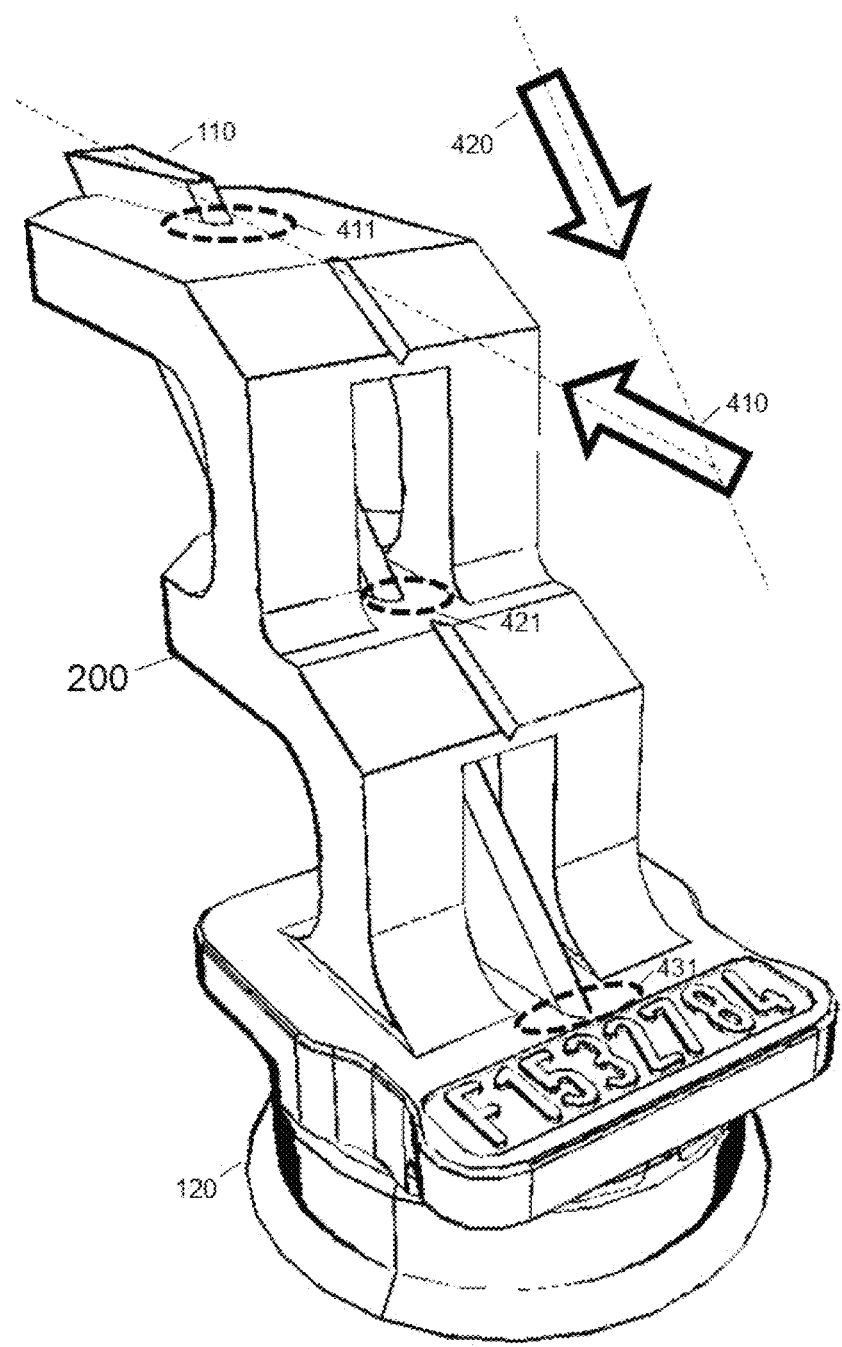

[Fig. 5]
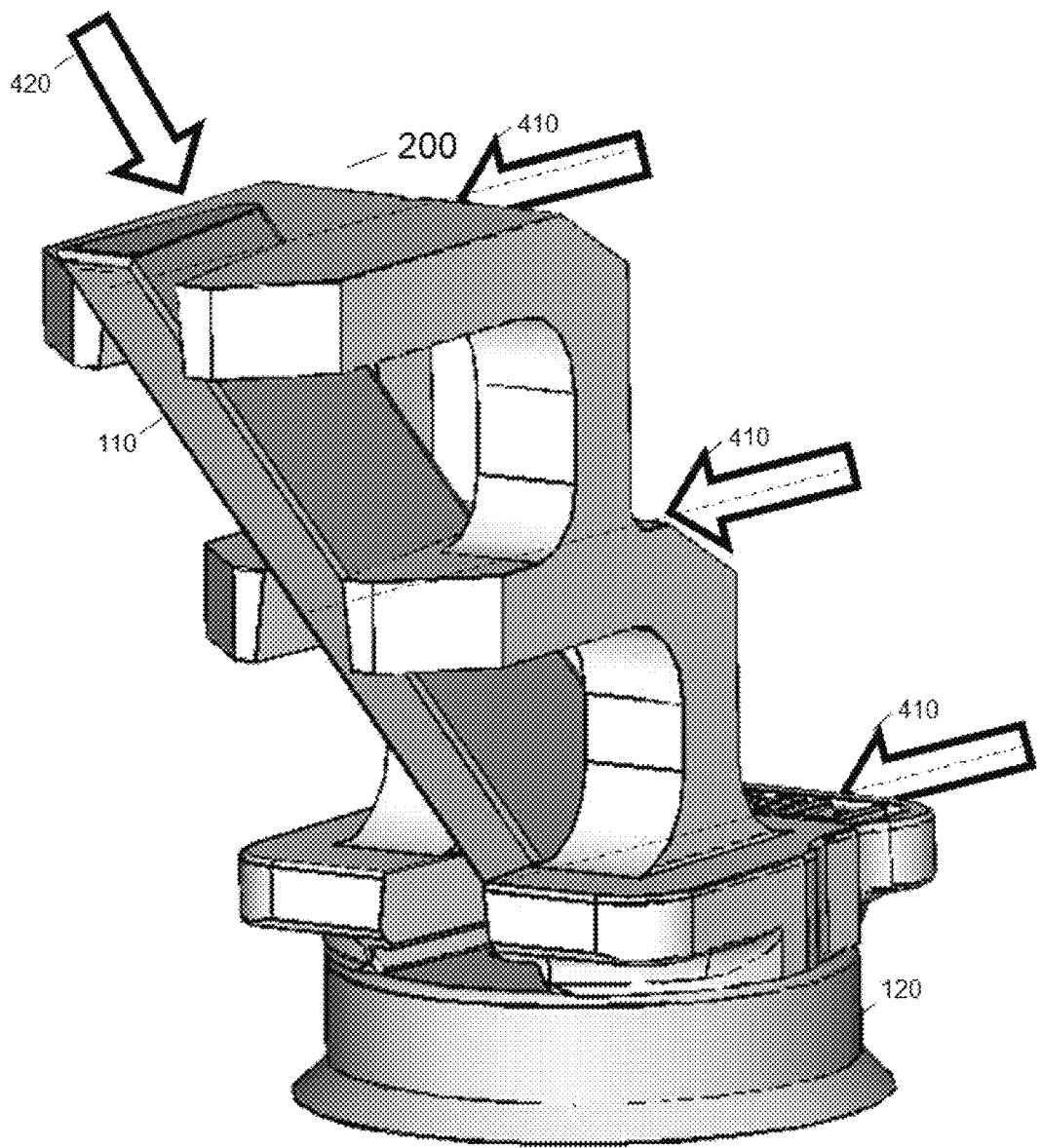

CHECKING AND ANGLE-OF-ATTACK SENSOR VANE ASSEMBLY

CROSS-REFERENCE TO RELATED APPLICATIONS

This application claims priority to foreign French patent application No. FR 1906004, filed on Jun. 6, 2019, the disclosure of which is incorporated by reference in its entirety.

FIELD OF THE INVENTION

The document relates to aeronautical maintenance and in particular to the on-aircraft checking of the vane assemblies with which aircraft angle-of-attack sensors are equipped.

BACKGROUND

An angle-of-attack sensor (or AOA sensor) is a physical device mounted on an aircraft (generally near the doors). An angle-of-attack sensor notably allows the risk of stall (boundary layer separation and complete loss of lift) to be determined.

An angle-of-attack sensor comprises a vane assembly. Angle of attack vane assemblies regularly sustain damage during maintenance operations or during the disembarkation of passengers or the off-loading of luggage from the holds (coming close to the nacelle and colliding). A vane assembly may be damaged in various ways (e.g. twisted, curled, torn, broken, concave or convex impact, etc.)

Certain damage may not be visible to the naked eye. Damage is therefore generally detected by the aircraft system during a subsequent flight. Non-visible damage also occurs on the last part of the aircraft assembly line and is not detected until after the first commissioned flight.

In order to check the geometry and correct operation of the vane assemblies, the angle-of-attack sensors are regularly removed at a repair station. At the present time, there is no device nor any reliable method for checking a vane assembly directly on an aircraft (other than by visual inspection).

The known approaches for determining and checking the compliance of an angle-of-attack sensor at a repair station notably involves the use of a rule or of a straight-edge, when there is a suspicion that the vane assembly has become twisted. A rule is a calibrated tool (i.e. a tool known to be straight). The rule is placed against the vane assembly and any deformation where appropriate becomes visible to the naked eye. The known solutions generally have disadvantages. For example, measuring with a rule may lead to difficulties of interpretation according to the position of the rule and to the vane-assembly defect. In addition, the material of the rule may damage the vane assembly if it turns out that the latter is not twisted. The use of a straight-edge may lead to difficulties in interpreting the result, for example depending on the position of the sensor and the twisting of the vane assembly. These methods are effective, but involve the removal of the angle-of-attack sensor.

In summary, the known methods are not optimal at the repair station; and especially these solutions are not satisfactory for checks performed directly on the aircraft (for example upon the arrival of an aircraft, or prior to its departure).

There is still a need for more sophisticated devices and methods for checking angle-of-attack sensors directly on the aircraft.

SUMMARY OF THE INVENTION

The document introduces methods and devices for checking the geometry of an angle-of-attack sensor belonging to an aircraft. According to the embodiments, said device comprises one or more stages, a stage comprising a slot the geometric dimensions of which are specifically configured to accept a portion of the said angle-of-attack sensor. The device allows a visual inspection but can also be instrumented (photoelectric cell, laser, camera) in order to verify the geometry of the sensor in detail. Developments notably describe the use of indicators, motorized stages, one or more image sensors, specific materials, communications with computers, or placement by drone and/or robotic arm. Software aspects are described.

Advantageously, the device according to the invention allows the condition of the vane assembly to be checked directly on the aircraft. The check is quick and reliable.

Advantageously, the predefined geometry of the tooling is able to conform to the geometry of the vane assembly, and allows an effective and precise result to be obtained. This facilitates the work of the maintenance crew, and of the teams working at the repair centres. In one embodiment, the device may take various tolerances into account, for example tolerances on perpendicularity or on straightness of the object being checked.

Advantageously, the device according to the invention avoids or limits errors in interpretation, in itself and in comparison with the known tool.

Advantageously, the device according to the invention allows pre-flight or post-flight maintenance (equally, as the mechanical effects, e.g. of expansion, associated with the cooling-down of the sensor heating system are negligible).

Advantageously, the device according to the invention may be portable and may notably be used simply and quickly on sensors installed on an aircraft.

BRIEF DESCRIPTION OF THE DRAWINGS

Further features, details and advantages of the invention will become apparent from reading the description given with reference to the attached drawings provided by way of example and which respectively depict:

FIG. 1 illustrates one example of an angle-of-attack sensor handled by the invention;

FIG. 2 illustrates one example of a device according to the invention for checking the geometry of the angle-of-attack sensor;

FIG. 3 illustrates certain aspects of the mechanical tolerances allowed for by the device according to the invention to accept an angle-of-attack sensor mounted on an aircraft;

FIG. 4 illustrates one example of the placing of the device according to the invention on an angle-of-attack sensor attached to an aircraft;

FIG. 5 illustrates, in a perspective view from the rear, the placement of the device according to the invention.

DETAILED DESCRIPTION

FIG. 1 illustrates an example of an angle-of-attack sensor handled by the invention.

An angle-of-attack sensor 140 comprises a body 130 and a vane assembly.

The vane assembly comprises a vane 110 and a (rotary, pivoting) base 120.

The body 130 is attached to an "aircraft plate" 141 (according to a design specific to each aircraft manufacturer).

When the aircraft is in flight, the relative wind 142 orientates the vane assembly via the vane 110 and causes the base 120 (the profile of which has negligible aerodynamic effects) to rotate about an axis 143. Electromechanical systems (not depicted, referred to as "synchro-resolvers") are then able to determine the angle of attack of the aircraft during flight.

The vane profile may adopt various alternative forms. In one embodiment, the profile is an NACA profile (an aerofoil profile with an intrados and an extrados, which are sometimes symmetrical and sometimes not). In one embodiment, the profile has a triangular cross section.

The height of the vane is of the order of 8 cm (and can vary according to the model).

An aircraft may comprise a plurality of angle-of-attack sensors. Faults with one angle-of-attack sensor are generally determined by making a comparison between a first sensor and a second sensor. An excessive difference may lead to the use of data coming from a third, backup, angle-of-attack sensor.

The vane of an angle-of-attack sensor may have various profiles (e.g. aerofoil or some other profile). The example illustrated in FIG. 1 shows a vane of triangular cross section.

Embodiments of the invention are described hereinafter.

There is described a device for checking the geometry of an angle-of-attack sensor of an aircraft, the angle-of-attack sensor comprising a body on which there is mounted a vane assembly made up of a base pivoting in the body and of a vane, the said device comprising several stages, a stage comprising a slot the geometric dimensions of which are specifically configured to accept a portion of the said angle-of-attack sensor when the device is butted against the vane of the vane assembly.

The device according to the invention may comprise a plurality of "stages" or "arms" or "levels" or "jaws".

The slots in the stages are dimensioned according to predefined manufacturing tolerance margins associated with the nominal dimensions of the angle-of-attack sensor. The tolerances may differ according to the embodiments.

In one embodiment, the tolerance on the angles is plus or minus (+/−) 1 degree and 30 minutes of arc. The tolerance on the distances is plus or minus one tenth of a millimetre (a few hundred microns). Nevertheless, these rules may change according to the type of sensor concerned.

For example, for a nominal (ideal, theoretical, manufacturing target) value of 8 cm for the sensor, an acceptable distance may lie between 7.99 cm and 8.01 cm (as a result of the manufacturing methods). A nominal angle of 17° may also correspond to an actual manufacture of between 18°30' and 16°30' (which will be the dimensions of the slot as appropriate). If the sensor has become deformed to the point that it measures 22° at the point considered, then there is the possibility that the device might be mechanically unable to complete the sensor. In some instances, it will still be possible for the two to fit together and the deviations will be visible or measurable.

In one development, the device comprises two stages. An embodiment involving two stages is advantageous in that it is easy to manufacture and allows a quick (visual) check that the vane assembly is not greatly damaged.

In one development, the device comprises three stages. An embodiment involving three stages is advantageous in that it constitutes a good compromise between the number of check points (ends, middle) and weight and portability. A visual check is easy.

In one development, the device comprises more than three stages. An embodiment involving N stages, where N>3, offers certain advantages that the other configurations either do not offer or offer to a lesser extent. Ultimately, when N is very large, the device tends towards the mould of the vane of the vane assembly. The number of check points is increased, thereby increasing the reliability of the check, but this may present certain disadvantages (particularly of lessening the simplicity and quality of a visual check where appropriate). In instances in which contactors are used, this disadvantage disappears.

In one development, the device further comprises a photoelectric cell and a light source, such as a laser, which are arranged in such a way as to check all or part of the straightness of the vane of the vane assembly.

In some embodiments, the check is a visual check (i.e. performed by an operator handling the device). For example, a vane assembly that is twisted will leave exposed gaps or spaces and it will be possible to conclude that the geometry of the vane assembly is not as expected. Depending on the embodiment, this check may be instrumented.

For example, a light source emitter and a photoelectric cell as a receiver may be used; these will be positioned at various stages (for example number 1 to N−1). It may furthermore have several cells and lasers (to check segments). If the vane assembly is twisted, the laser stream will be unable to pass and will trigger an alert (luminous or audible indicator, vibration, haptic feedback, etc.). Conversely, if the stream is uninterrupted, a positive message may be transmitted (including logically, e.g. to the operator's mobile telephone).

In other embodiments, one or more lasers can be used. For example, one laser can be used to check the straightness of the vane while a grazing (surface-skimming) laser may contribute to detecting damaged walls or flanks (particularly if it is coupled to a photographic sensor or to a camera or to an imaged acquisition device).

In one development, at least one stage comprises one or more image sensors. In one embodiment, the device comprises one or more photographic or video-graphic devices. Static images or videos may be captured (e.g. in macro). Image analysis methods may detect damage using the images (e.g. scratches, faults, dents, bumps, etc). Changes of light may be performed in order to conduct the analyses. The use of several image sensors allows stereoscopic capture and therefore the surface condition of the vane assembly can be examined.

In one development, at least one stage is motorized. Depending on the embodiment, one or more stages may be motorized (in the horizontal and/or vertical plane), so as to sample the deformations of the vane assembly (where appropriate); for example, the stages may advance/retreat and/or alternatively still may rise/fall in order to check the geometry of the sensor. The advantage of these embodiments is that they form a "universal" device for checking the geometry, i.e. a device that can be adapted to each aircraft or sensor, for example by loading a simple configuration file.

In one development, the device is obtained at least partially by additive printing. Depending on the embodiment, 3D printing may prove particularly suitable.

In one development, one or more parts of the device are made from materials the hardness properties of which are selected so as not to damage the vane of the angle-of-attack sensor. The device may be coated with or comprise parts made of, for example, non-abrasive plastic, Teflon, etc. The materials used in said device may advantageously be of a hardness lower than the treatment of the exterior surface material of the vane of the angle-of-attack sensor. Secondarily, the materials used are heat resistant because the vane assembly is generally heated (high altitudes are characterized by very low temperatures). In general, on the ground after taxiing, the sensor cools down quickly.

In one development, the device further comprises one or more indicators to avoid or reduce the risk of being left behind on the aircraft. The indicators may comprise the use of flashes, fluorescent or phosphorescent paint, etc.

In one development, the device is connected. The device may for example comprise a communication module (e.g. Bluetooth, Wifi, 3G, 4G, LTE, 5G etc). It may notably be connected to a mobile telephone or to a remote server.

In one development, the device further comprises a retaining mechanism for retaining said device when it is positioned against the vane assembly. In one embodiment, a "slide-and-lock" mechanism may actually make operations conducted at a height on an aircraft stationary on the ground easier. Sliding may be facilitated for example by coatings of the Teflon type, or by the use of rolling-bearing microballs (or both). Whilst the device is in abutment, at the behest of the operator or else automatically (e.g. on detection of abutment), a position locking mechanism may be activated. In that way, the operator can move around the device in action, while avoiding allowing the device to fall. The locking mechanism may work by suction (pneumatic suction), by magnetism (e.g. electromagnet), mechanically (e.g. retaining lugs, etc.) or by a combination of these retention means.

Also described is a method implemented by a computer for checking the geometry of an angle-of-attack sensor, comprising the steps of:

placing a device according to the invention against the vane of an angle-of-attack sensor that is to be checked; verifying the geometry of the angle-of-attack sensor with respect to a predefined geometry by measuring, for example, one or more geometric points. Placement may be robotized (robotic arm, drone, etc.). The geometry checks may be performed manually and/or automatically.

In one development, the device is placed against the angle-of-attack sensor by a drone and/or by a robotic arm. For example, the passenger embarkation system may comprise one or more motorized arms which may perform such placements.

In one development, the method further comprises a step of emitting a message and/or a light signal and/or an audio signal and/or a vibration. The triggering of this step may for example depend on the step of verifying the geometry of the angle-of-attack sensor.

The present invention can be implemented using hardware and software elements. It may be available as a computer program product on a medium readable by a computer. The computer program product may comprise code instructions for carrying out one or more steps of the method when said program is executed on a computer.

FIG. 2 illustrates one example of a device according to the invention for checking the compliance of an angle-of-attack sensor.

In one embodiment, the device according to the invention comprises two stages. In an embodiment illustrated in FIG. 2, the device according to the invention comprises three stages 210, 220 and 230, arranged at regular spacings. The lower stage 230 may be placed on the base of the angle-of-attack sensor 120. In certain embodiments, the device according to the invention may comprise a greater number of stages (i.e. increasing the number of check points). A configuration involving three stages is generally sufficient (i.e. a satisfactory compromise between weight and checks).

The device according to the invention can be positioned on the base 120 of the vane assembly 130 and allows the geometry of the vane thereof to be checked in a way that is simple, rapid and safe (without damaging it).

The term geometry refers mainly to the straightness and perpendicularity of the vane. The straightness of the vane is the straightness along the longitudinal axis of the vane (the leading edge needs to be along a segment of a straight line, being neither convex nor concave). The plane of the vane needs to be perpendicular to the base of the vane assembly. The flanks or faces of the vane need to be substantially planar.

Other geometric parameters (shape defects) may be determined or checked by means of the device according to the invention: one or more dimensions (e.g. height), parallelism, excursion(s), flatness, angle(s), inclination(s), position(s), symmetry (symmetries) or asymmetry (asymmetries), perpendicularity, etc. Furthermore, surface conditions may be studied (e.g. corrosion, scratching, partial melting, etc.).

FIG. 3 illustrates certain aspects of the mechanical tolerances allowed by the device according to the invention so as to accommodate the angle-of-attack sensor mounted on the aircraft. The angle 310 corresponds to the angle of the triangular cross section of the vane of the vane assembly.

The mechanical tolerances may be obtained mechanically (e.g. by providing a few hundreds of microns of clearance between the jaw elements of each stage). If the angle-of-attack sensor is excessively damaged, then it may become impossible to fit the vane into the device according to the invention. In the event of slight damage, which is most cases, the device allows the deformations to be inspected. In other words, the device according to the invention is able to (physically) "encode" the acceptable mechanical tolerances regrading the deformations of the vane of the sensor. If there is very little by way of margin regarding the desired geometry of the sensor, the accommodation dimensions incorporated into the device 200 will be very close to the nominal dimensions.

FIG. 4 illustrates an example of the placement of the device according to the invention on a vane assembly.

This placement may be carried out in various ways. In one embodiment, placement is carried out by lateral sliding 410. In one (secondary) embodiment, placement is performed by slotting on (downwards); the latter embodiment may allow for checks to the flank of the vane, but carries associated risks (e.g. of scratching).

When the device according to the invention is pushed laterally, the (three) arms of which it is composed hug the profile of the vane assembly. When the tooling is positioned on the base of the vane assembly, the arms may come into contact with it, where appropriate, signifying that the vane assembly is not twisted or damaged. Several visual check regions are accessible, for example the regions 411, 421 and 431. If the straightness of the vane has become deflective, then one or more gaps will be visible at the visual check regions. For example, the checking region 421 will reveal that the vane is not perfectly in contact with the stage 200.

FIG. 5 illustrates, in perspective from the rear, the placement of the device according to the invention for checking the geometry of the angle-of-attack sensor.

The device according to the invention 200 is brought into contact from the rear forward in order to fit around the vane 110 pushed onto the base 120. Alternatively, the device can be pushed onto or slipped (downwards) onto the vane assembly on the aircraft.

A vast number of embodiment variants are possible. The description given hereinafter is not exhaustive and the variations can be combined with one another.

In one optional embodiment, each stage has graduations (for example in millimetres) to allow the user to visually quantify the damage caused to the vane assembly.

In one optional embodiment, electrical contactors may be connected to light systems (for example LEDs placed in the visual check regions 411,421 and 431). In that way, a user positioned at a height against the aircraft and placing the device 200 in abutment against the vane 110 will be notified of the contact (e.g. green LED) or absence of contact (e.g. red LED) between the vane 110 and the device 200 (in the region of the stages). In one embodiment, poor contact may be signified by the use of an orange LED. A single display may summarize the situation (for example on the top or the sides of the device, in order to avoid the user wishing to make the check of the geometry of the angle-of-attack sensor having to perform contortions).

In one optional embodiment, one or more stages are motorized (e.g. to advance and retreat by a few millimetres). In this way, the device according to the invention may be dynamic, and thereby quantify the geometric dimensions of the sensor being checked.

In one optional embodiment, use is made of a strong material in order to avoid deformations and not damage the vane. For example, Fortal 7075 may be used. The surface treatment may involve a colourless anodizing associated with Fluoref 800. The paint may for example be PAINT PU NF 1805 03FT1/DT6SC.

In one optional embodiment, the device according to the invention may be red in colour (or fluorescent or phosphorescent) to avoid its being left behind on the aircraft. Alternatives involve the use of light indicators that flash discontinuity as long as the device has not been removed from the surface of the aircraft, etc.

The invention claimed is:

1. An assembly comprising:
   an angle of attack sensor of an aircraft, the angle of attack sensor comprising a body and a vane assembly mounted on said body, the vane assembly comprising a vane and a base, the base of the vane assembly being pivotable relative to the body and the vane; and
   a device comprising several levels, each level comprising a notch whose geometric dimensions are specifically configured to receive and embrace a portion of the vane of the angle of attack sensor when the device is placed against the vane of the vane assembly directly on the aircraft.

2. The assembly according to claim 1, wherein the several levels of said device comprises only two levels.

3. The assembly according to claim 1, wherein the several levels of said device comprises only three levels.

4. The assembly according to claim 1, wherein the several levels of said device comprises more than three levels.

5. The assembly according to claim 1, wherein said device comprises a photoelectric cell and a laser, which are arranged in such a way as to check the straightness of the vane of the vane assembly.

6. The assembly according to claim 1, wherein at least one level comprises one or more image sensors.

7. The assembly according to claim 1, wherein at least one level is motorized.

8. The assembly according to claim 1, wherein said device is obtained at least partially by additive printing.

9. The assembly according to claim 1, wherein one or more parts of the device are made from materials the hardness properties of which are inferior to that of the external surface material of the vane of the angle of attack sensor.

10. The assembly according to claim 1, further comprising a signal light to avoid or reduce the risk of being left behind on the aircraft.

11. The assembly according to claim 1, said device configured for being connected to a mobile telephone or to a remote server, the device comprising a communication module including at least one of Bluetooth, Wifi, 3G, 4G, LTE, and 5G.

12. The assembly according to claim 1, further comprising a slide and lock mechanism for retaining said device when it is positioned against the vane assembly.

13. A method for checking the geometry of a vane of an angle of attack sensor directly on an aircraft, comprising the steps of:
   using the assembly of claim 1 to place the device against the vane of the angle of attack sensor to be directly controlled on the aircraft; and
   verifying the geometry of the vane of the angle of attack sensor with respect to a predefined geometry by measuring one or more geometric points of the device placed against the vane of the angle of attack sensor.

14. The method according to claim 13, wherein the device is placed against the angle of attack sensor by a drone and/or by a robotic arm.

15. The method according to claim 13, further comprising a step of emitting a message and/or a light signal and/or an audio signal and/or a vibration depending on the step of verifying the geometry of the vane of the angle of attack sensor.

* * * * *